UNITED STATES PATENT OFFICE.

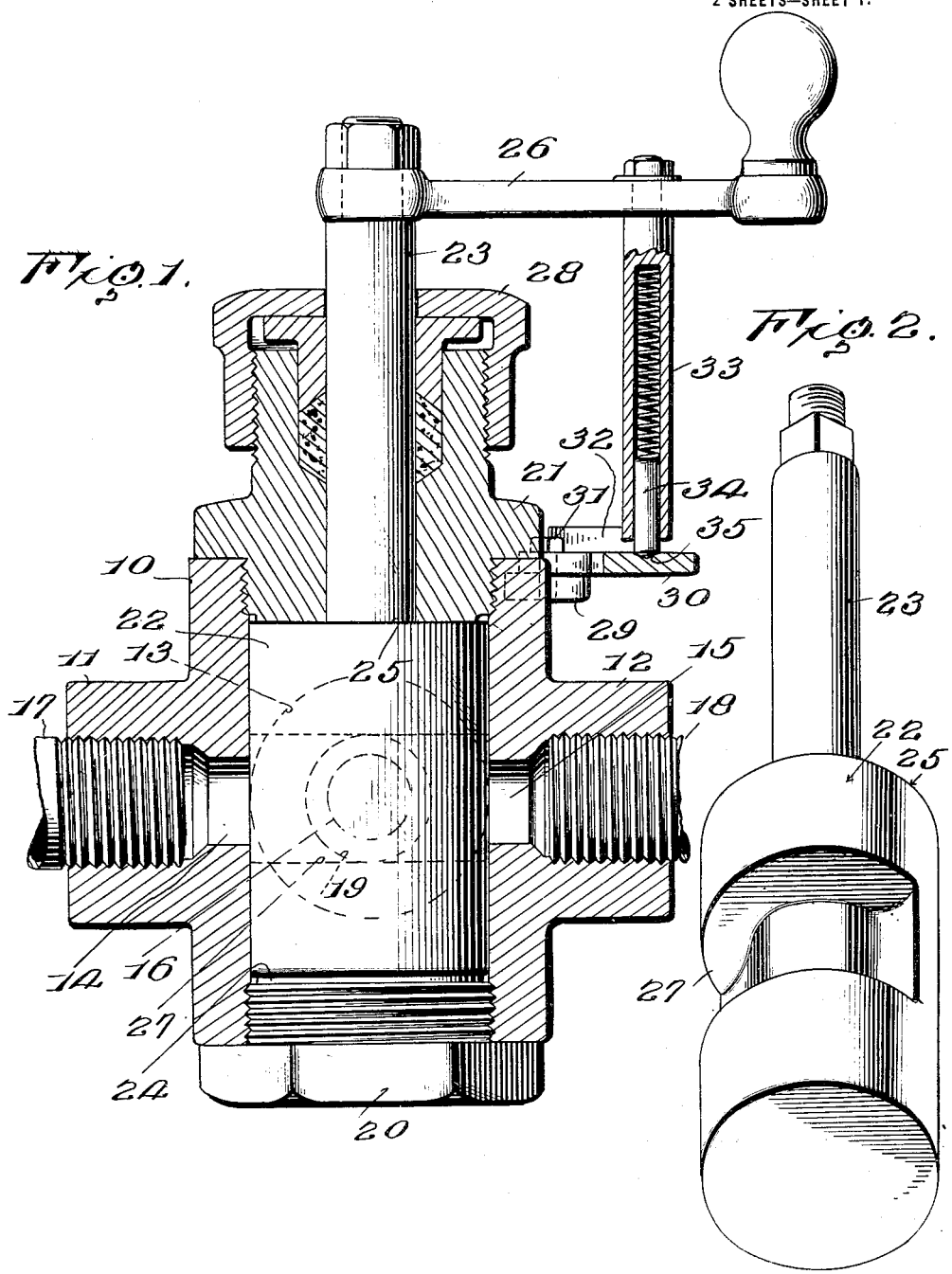

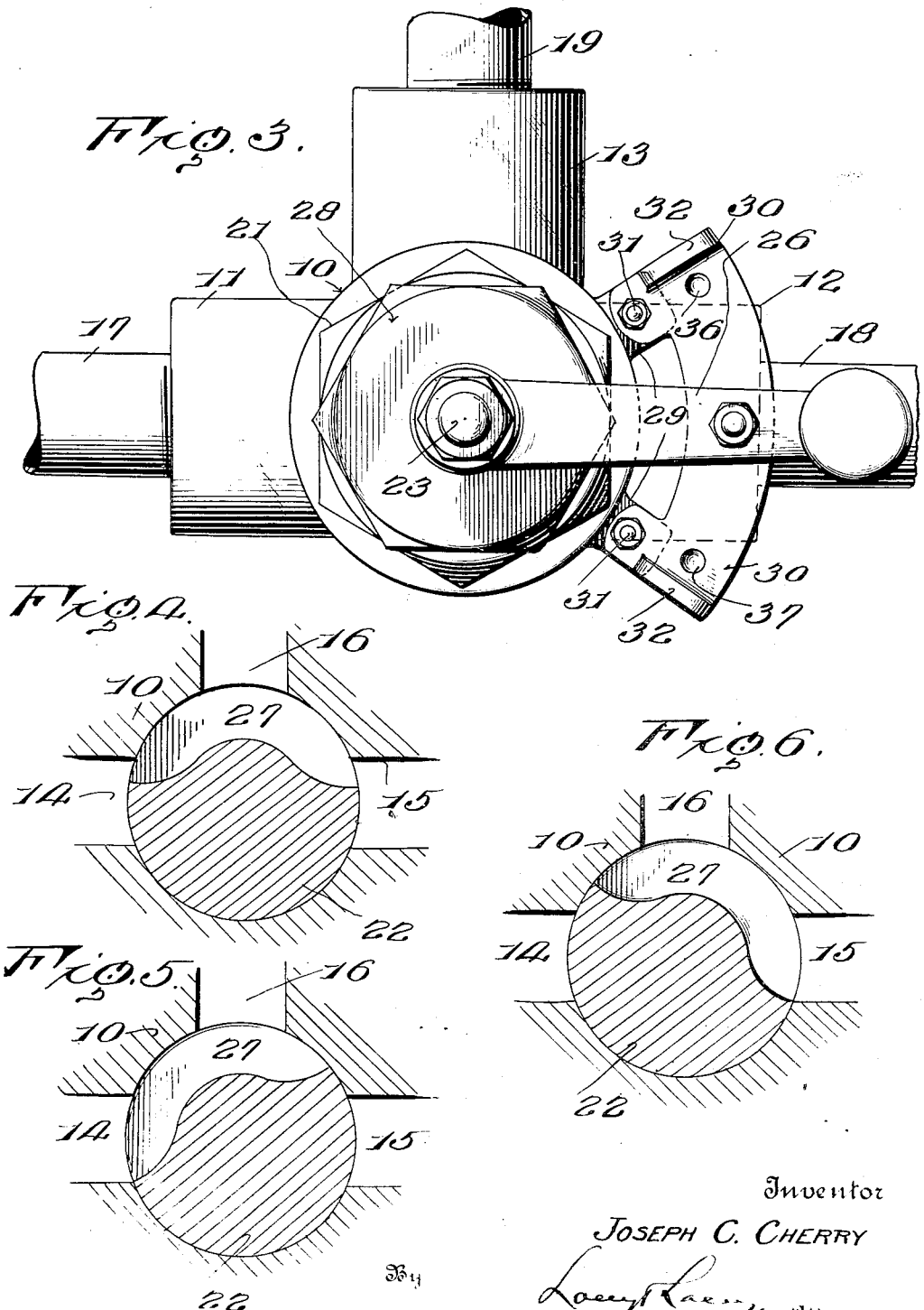

JOSEPH CHESTER CHERRY, OF BALLINGER, TEXAS.

COMPOUND VALVE.

1,319,755.     Specification of Letters Patent.     Patented Oct. 28, 1919.

Application filed May 21, 1918. Serial No. 235,863.

*To all whom it may concern:*

Be it known that I, JOSEPH CHESTER CHERRY, a citizen of the United States, residing at Ballinger, in the county of Runnels and State of Texas, have invented certain new and useful Improvements in Compound Valves, of which the following is a specification.

This invention relates to improvements in valves, more particularly to devices of this character employed for controlling the flow of liquids under a high pressure, and has for one of its objects to simplify and improve the construction and increase the efficiency and utility of devices of this character.

Another object of the invention is to provide a device of this character adapted to be arranged to permit liquid to flow continuously therethrough or to direct the liquid therethrough from a plurality of directions.

With these and other objects in view, the invention consists in certain novel features of construction, as hereinafter shown and described and then specifically pointed out in the claims; and in the drawings illustrative of the preferred embodiment of the invention—

Figure 1 is a vertical sectional elevation of the improved valve,

Fig. 2 is a detached perspective view of the valve plug,

Fig. 3 is a plan view with the valve operating lever in neutral position,

Fig. 4 is a sectional detail showing the valve plug in neutral position,

Fig. 5 is a sectional detail showing the valve plug in position to conduct the fluid to the left, Fig. 6 is a sectional detail showing the valve plug in position to conduct the fluid to the right.

The improved valve comprises a shell or casing 10 having a continuous bore and provided with oppositely directed bosses or hubs 11—12 and a third boss or hub 13 at right angles to the bosses 11—12. The several bosses or hubs communicate respectively with the interior of the shell by passages represented at 14—15 and 16. The hubs are likewise internally threaded to receive conductor pipes 17—18 and 19 respectively. The shell 10 is internally threaded at the ends and a closure cap 20 engages one threaded end and another closure cap 21 engages the opposite threaded end. Fitting within the shell 10 is a valve plug 22 and provided with a stem 23 passing through the cap member 21. At its inner side the cap 20 is provided with a bearing face 24 engaging against the adjacent end of the plug 22, while the closure member 21 is provided with a similar bearing face 25 engaging against the opposite end of the plug. By this means the plug is maintained in position and prevented from movement longitudinally of the shell. The stem 23 is provided with an operating handle or lever 26, and the body of the plug is provided with a transverse recess or passage 27.

The closure cap 21 is provided with a stuffing box 28 through which the stem 23 passes.

The conductor pipe 19 is the intake of the valve while the conductors 17 and 18 are the outlets of the valve. The passage 27 of the plug 22 opens through one side of the plug and is of sufficient size to open all three of the passages 14—15 and 16 when the plug is arranged in neutral position as shown in Figs. 1-3 and 4, or provide communication between the passages 14, and 16 when arranged as shown in Fig. 5, and provide communication between the passages 16 and 15 when arranged as shown in Fig. 6.

The valve is designed for use more particularly in connection with pressing devices employed with high pressure mechanism, such as cotton packers and the like. The pressure applying medium, generally hydraulic, is arranged to supply the presses and packers from the same source, and the valve which is the subject matter of the present application is designed to provide a simple and effectual means whereby the pressure applying medium may be conducted to a press or the packer mechanism or equally to both, and likewise so arranged that it will be impossible to cut off the flow entirely, thereby preventing undue pressure from being built up which would be detrimental to the pressure applying mechanism. Projecting from the shell 10 are ears 29 to which a segmental member 30 is bolted or otherwise secured as shown at 31. The segmental member 30 is provided with vertical stops 32 at the ends. Depending from the handle 26 is a tubular member 33 carrying a spring actuated bolt 34 to engage in seats in the member 30, the seats corresponding to the various positions of the valve. For instance a central seat 35 for the bolt 34 when the handle 26 is moved to set the valve in neutral position, as in Fig. 4, a terminal seat 36 for the bolt 34 when the handle 26 is moved to set the valve in its left position as in Fig. 5, and a terminal seat 37 for the bolt 34 when the handle is moved to set the valve in right position as in Fig. 6. The terminal stops 32 extend into the path of the member 33 and operate to limit the movement of the operating lever 26 so that the valve plug can never be turned to wholly cut off the flow therethrough. The improved valve construction therefore provides for a continuous open flow through the valve at all times no matter in what position the valve may be placed. Thus the source of supply is never cut off, but provides for a change of flow, but never stops it. The principal function of the improved valve therefore is to cause the liquid to flow to either the packer or the press, or let the flow go to both at the same time; but to never cut off the flow from the packer and press at the same time. By this means the liquid from the source of supply will at all times freely flow to either the packer or the press or both. Thus either one of the pressure applying devices may be cut off without detriment to the pressure producing apparatus.

The improved device is simple in construction and can be strongly and durably manufactured with a minimum of manual labor.

Having thus described the invention, what is claimed as new is:

1. A valve including a casing having an inlet port and oppositely disposed outlet ports to permit the constant passage of liquid through the casing, said casing having its interior walls at the opposite ends thereof threaded, a plug mounted for turning movement within the casing for controlling the flow of liquid from the inlet port through either or both outlet ports, a cap engaging the threads at one end of the casing and provided with a flat bearing surface for engagement with the adjacent end of the plug, a gland engaging the threads on the other end of the casing and provided with a flat bearing surface for engagement at the opposite end of the plug, said plug being provided with a stem extending through the gland, lugs extending laterally from the casing, a plate secured to the lugs and provided with terminal and intermediate depressions, an operating lever, a tubular member depending from the operating lever, a locking pin disposed within the tubular member and adapted to engage any one of the depressions, and a spring bearing against the locking pin.

2. In a valve, a casing having alined outlet ports and an inlet port communicating with the casing between the outlet ports to permit the constant passage of fluid through the casing, a solid plug mounted for turning movement in the casing and having its exterior wall cut-away to form a circumferential passage which, in one position of the plug has its intermediate portion presented directly toward the inlet port and its ends communicating with the respective outlet ports, and in either extreme position of the plug has one of its ends in communication with the inlet port and its other end in communication with the respective outlet port, an operating handle secured to the plug, and means connected with the handle for positively holding the plug in any one of its different positions without interrupting the flow of liquid through the casing.

3. In a valve, a casing having alined outlet ports and an inlet port communicating with the casing between the outlet ports to permit the constant passage of fluid through the casing, a solid plug mounted for turning movement in the casing and having its exterior wall cut-away to form a circumferential passage which, in one position of the plug has its intermediate portion presented directly toward the inlet port and its ends communicating with the respective outlet ports, and in either extreme position of the plug has one of its ends in communication with the inlet port and its other end in communication with the respective outlet port, a plate secured to the exterior of the casing and provided with terminal and intermediate depressions corresponding to the outlet and inlet ports, an operating handle secured to the plug, and a locking member depending from the handle and adapted to fit in the depressions for holding the plug in its different positions of adjustment.

4. In a valve, a casing having alined outlet ports and an inlet port communicating with the casing between the outlet ports to permit the constant passage of fluid through the casing, a solid plug mounted for turning movement in the casing and having its exterior wall cut-away to form a circumferential passage which, in one position of the plug has its intermediate portion presented directly toward the inlet port and its ends communicating with the respective outlet ports, and in either extreme position of the plug has one of its ends in communication with the inlet port and its other end in communication with the respective outlet port, means for positively holding the plug in its different positions of adjustment, and means for limiting the turning movement of the plug whereby to permit the constaint flow of liquid through the valve casing at all times.

5. In a valve, a casing having alined outlet ports and an inlet port communicating with the casing between the outlet ports to permit the constant passage of fluid through the casing, a solid plug mounted for turning movement in the casing and having its exterior wall cut-away to form a circumferential passage which, in one position of the plug has its intermediate portion presented directly toward the inlet port and its ends communicating with the respective outlet ports, and in either extreme position of the plug has one of its ends in communication with the inlet port and its other end in communication with the respective outlet port, a plate secured to the exterior of the casing and provided with terminal upstanding lugs and intermediate stops, an operating handle secured to the plug, and a locking member depending from the handle and adapted to engage the intermediate stops for holding the plug in its different positions of adjustment, said locking member by engagement with the terminal upstanding lugs serving to limit the rotation of the plug within the casing whereby to permit the passage of liquid through the casing at all times.

In testimony whereof I affix my signature.

JOSEPH CHESTER CHERRY. [L. S.]